United States Patent
Yu et al.

(10) Patent No.: US 11,498,997 B2
(45) Date of Patent: Nov. 15, 2022

(54) PROCESS FOR REMOVAL OF VOLATILE COMPOUNDS FROM TACKIFIERS

(71) Applicant: BASF SE, Ludwigshafen am Rhein (DE)

(72) Inventors: Miran Yu, Ludwigshafen (DE); Ortmund Lang, Ludwigshafen (DE); Dieter Rodewald, Ludwigshafen (DE); Stephan Schlitter, Limburgerhof (DE); Guenter Scherr, Ludwigshafen (DE); Felix Alexander Westerhaus, Hanau (DE)

(73) Assignee: BASF SE, Ludwigshafen am Rhein (DE)

( * ) Notice: Subject to any disclaimer, the term of this patent is extended or adjusted under 35 U.S.C. 154(b) by 189 days.

(21) Appl. No.: 16/963,681

(22) PCT Filed: Jan. 23, 2019

(86) PCT No.: PCT/EP2019/051636
§ 371 (c)(1),
(2) Date: Jul. 21, 2020

(87) PCT Pub. No.: WO2019/149597
PCT Pub. Date: Aug. 8, 2019

(65) Prior Publication Data
US 2021/0079150 A1 Mar. 18, 2021

(30) Foreign Application Priority Data
Feb. 2, 2018 (EP) .................... 18154940

(51) Int. Cl.
*B01D 1/06* (2006.01)
*C08G 2/28* (2006.01)
*C08G 8/12* (2006.01)

(52) U.S. Cl.
CPC ............. *C08G 2/28* (2013.01); *B01D 1/065* (2013.01); *C08G 8/12* (2013.01)

(58) Field of Classification Search
CPC ............ B01D 1/065; C08G 2/28; C08G 8/12
See application file for complete search history.

(56) References Cited

U.S. PATENT DOCUMENTS 3,514,417 A * 5/1970 Bickel .................. C08L 23/16
524/483
11,248,118 B2 * 2/2022 Westerhaus ............. C08G 8/12

| | | | |
|---|---|---|---|
| 2014/0219893 A1* | 8/2014 | Imoto | B01D 3/12 203/91 |
| 2016/0024043 A1* | 1/2016 | Stepanski | B01D 3/148 202/185.1 |
| 2017/0121490 A1* | 5/2017 | Miyazaki | B60C 1/00 |
| 2017/0298256 A1* | 10/2017 | Schultz | C09J 7/385 |
| 2020/0231718 A1* | 7/2020 | Lawson | B01J 8/0055 |
| 2020/0231719 A1* | 7/2020 | Lawson | B01J 19/2435 |
| 2020/0255654 A1* | 8/2020 | Westerhaus | C08L 9/06 |
| 2021/0139686 A1* | 5/2021 | Krawicz | C08L 23/22 |

FOREIGN PATENT DOCUMENTS

| | | |
|---|---|---|
| CN | 102219883 A | 10/2011 |
| DE | 734 493 | 4/1943 |
| DE | 10 2005 054 877 A1 | 5/2007 |
| WO | WO 2018/104151 A1 | 6/2018 |
| WO | WO 2018/156415 A1 | 8/2018 |

OTHER PUBLICATIONS

ESPACENET Machine Translation of CN102219883A Obtained Mar. 23, 2022. (Year: 2022).*
International Search Report dated Apr. 17, 2019 in PCT/EP2019/051636 filed on Jan. 23, 2019.
International Preliminary Report on Patentability dated Aug. 4, 2020 in PCT/EP2019/051636 filed Jan. 23, 2019, 7 pages.

* cited by examiner

*Primary Examiner* — Jonathan Miller
(74) *Attorney, Agent, or Firm* — Grüneberg and Myers PLLC

(57) ABSTRACT

Process for the removal of volatile compounds from a tackifier comprising a resin with repeating units of formula I wherein $R^1$ is a linear or branched alkylen group with 1 to 10 carbon atoms and $R^2$ is a linear or branched, saturated or unsaturated N aliphatic hydrocarbon group with up to 20 carbon atoms, and optionally a plasticizer, wherein the tackifier is passed through at least one evaporator as film and the volatile compounds are removed from the film.

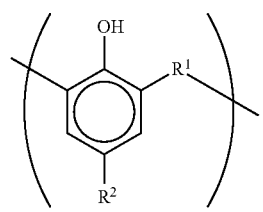

20 Claims, No Drawings

PROCESS FOR REMOVAL OF VOLATILE COMPOUNDS FROM TACKIFIERS

TITLE OF THE INVENTION

BACKGROUND OF THE INVENTION

1. Field of the Invention

Object of the invention is a process for the removal of volatile compounds from a tackifier comprising a resin with repeating units of formula I

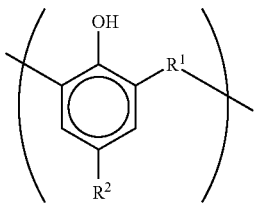

wherein $R^1$ is a linear or branched alkylene group with 1 to 10 carbon atoms and $R^2$ is a linear or branched, saturated or unsaturated aliphatic hydrocarbon group with up to 20 carbon atoms, and optionally a plasticizer, wherein the tackifier is passed through at least one evaporator as film and the volatile compounds are removed from the film.

2. Description of Related Art

A well-known resin with repeating units of formula I is Koresin®, a tackifier resin marketed by BASF and described for example in DE 734 493. Koresin® is added as tackifier to rubber compositions for the manufacturing of rubber articles, which are in particular tires for cars or trucks. Patent application PCT/EP2017/081051 (INV 161174) describes mixtures of Koresin and low molecular weight non-aromatic compounds. These mixtures have a lower glass transition point but nevertheless good properties for technical application.

SUMMARY OF THE INVENTION

Koresin® is prepared by reacting para tertiary butyl phenol with acetylene. Koresin is solid at room temperature and has a glass transition point of ca 110° C. In the liquid state, Koresin has a high viscosity.

Koresin may comprise a residual amount of para tertiary butyl phenol. For technical applications and environmental protection, a Koresin with a very low content of volatile contents is desired.

It was an object of the invention to provide a process for the reduction of volatile compounds in Koresin and other tackifiers. The process should be very efficient. The amount of volatile compounds should be reduced significantly. Costs for investment and operation should be low.

Accordingly, the process defined above has been found.

To the Resin

The tackifier comprises a resin with repeating units of formula I

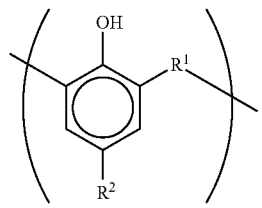

wherein $R^1$ is a linear or branched alkylen group with 1 to 10 carbon atoms and $R^2$ is a linear or branched, saturated or unsaturated aliphatic hydrocarbon group with up to 20 carbon atoms.

Preferably, $R^1$ in formula I is a linear or branched alkylen group with 1 to 4 carbon atoms. In a particularly preferred embodiment of the invention $R^1$ in formula I is $CH_2$ or HC—$CH_3$ or $H_2C$—$CH_2$. In a most preferred embodiment of the invention, $R^1$ in formula I is HC—$CH_3$ or $H_2C$—$CH_2$. HC—$CH_3$ or $H_2C$—$CH_2$ are structural isomers; usually the resin may contain both, $R^1$ being HC—$CH_3$ as well as $R^1$ being $H_2C$—$CH_2$ depending on the process of polymerization. In this application "HC—$CH_3$ or $H_2C$—$CH_2$" is understood to include any combinations thereof.

Preferably, $R^2$ in formula I is a linear or branched, saturated or unsaturated aliphatic hydrocarbon group with 4 to 10 carbon atoms. In a particularly preferred embodiment of the invention $R^2$ in formula I is a linear or branched, saturated or unsaturated aliphatic hydrocarbon group with 4 carbon atoms. In a most preferred embodiments $R^2$ is para-tertiary-butyl.

Resins with $R^1$ being $CH_2$ may be obtained by reacting a phenyl compound of formula $R^2$—$C_6H_4$—OH with formaldehyde. In this reaction formaldehyde adds to a carbon atom of $R^2$—$C_6H_4$—OH (usually the carbon atom in ortho position to the OH group) followed by reaction of the obtained methylol group with further $R^2$—$C_6H_4$—OH under elimination of water. The obtained resin may to some extent be crosslinked as further formaldehyde might add to the less reactive meta position.

Resins with $R^1$ being HC—$CH_3$ or $R^1$ being $H_2C$—$CH_2$ or combinations thereof may be obtained by reacting a phenyl compound of formula $R^2$—$C_6H_4$—OH with acetylene. In this reaction acetylene adds to a carbon atom of $R^2$—$C_6H_4$—OH (usually the carbon atom in ortho position to the OH group) followed by reaction of the obtained vinyl group with further $R^2$—$C_6H_4$—OH. The obtained resin may to some extent be crosslinked as further acetylene might add to the less reactive meta position.

Most preferred resin is Koresin, a resin marketed by BASF, and which is obtainable by reacting acetylene and para tertiary butyl phenol.

Koresin® comprises units of formula II

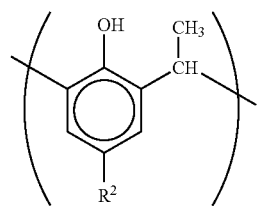

Due to an alternative integration of the acetylene in the reaction Koresin® may further comprise units of formula III

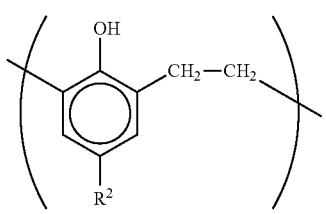

$R^2$ in formula II and III is para tertiary butyl.

End groups of the polymeric molecules of Koresin® may notably be vinyl groups which result from acetylene.

The resin may comprise further structural elements which are incorporated by using comonomers or reactive additives as further starting materials in the reaction.

Preferably, at least 80% by weight of the starting materials used for the preparation of the resin are $R^2$—$C_6H_4$—OH and formaldehyde (in case of $R^1$=$CH_2$) or $R^2$—$C_6H_4$—OH and acetylene (in case of $R^1$=HC—$CH_3$ or $R^1$=$H_2C$—$CH_2$ or mixtures thereof).

In a more preferred embodiment at least 90%, particularly at least 95% by weight, respectively 100% of the starting materials used for the preparation of the resin are $R^2$—$C_6H_4$—OH and formaldehyde (in case of $R^1$=$CH_2$) or $R^2$—$C_6H_4$—OH and acetylene (in case of $R^1$=HC—$CH_3$ or $R^1$=$H_2C$—$CH_2$ or combinations thereof).

In a most preferred embodiment no other starting materials than $R^2$—$C_6H_4$—OH and formaldehyde (in case of $R^1$=$CH_2$) or $R^2$—$C_6H_4$—OH and acetylene (in case of $R^1$=HC—$CH_3$ or $R^1$=$H_2C$—$CH_2$ or combinations thereof) are used for the preparation of the resin.

To the Plasticizer

The tackifier may furthermore comprise a plasticizer.

In a preferred embodiment of the invention, the tackifier comprises a plasticizer.

Preferably, the plasticizer is a non-aromatic compound which consists to at least 50% by weight of one or more linear or branched, saturated or unsaturated aliphatic hydrocarbon groups with at least 4 carbon atoms.

More preferably, the non-aromatic compound consists to at least 60% by weight, in particular to at least 70%, respectively at least 80% by weight of linear or branched, saturated or unsaturated aliphatic hydrocarbon groups with at least 4 carbon atoms.

The hydrocarbon groups may preferably be hydrocarbon groups with at least 6 carbon atoms, notably with at least 8 carbon atoms, respectively with at least 10 carbon atoms. Usually, the number of carbon atoms of the hydrocarbon groups will be at maximum 60, notably at maximum 40 and in preferred embodiments at maximum 20.

In a particularly preferred embodiment the non-aromatic compound consists to at least 80% by weight of linear or branched, saturated or unsaturated, aliphatic hydrocarbon groups with from 10 to 60 carbon atoms.

The non-aromatic compound may be a pure hydrocarbon which does not comprise any other chemical elements or functional groups.

The non-aromatic compound may be a hydrocarbon compound comprising one or more hydrocarbon groups and further functional groups. In a preferred embodiment, the further functional groups are selected from groups comprising oxygen or nitrogen atoms.

Preferably, such further functional groups are alcohol groups, primary, secondary or tertiary amino groups, carbonyl groups, such as aldehyde or keto groups, carboxylic acid groups, carboxylic anhydride groups, carboxylic ester groups, carboxylic amid groups or dicarboxylic imide groups.

Preferably, the non-aromatic compound does consist of carbon, hydrogen and optionally of oxygen and nitrogen atoms, only.

In a particularly preferred embodiment the non-aromatic compound does consist of carbon, hydrogen or of carbon, hydrogen and oxygen, only.

In a most preferred embodiment the non-aromatic compound does consist of carbon, hydrogen and oxygen, only.

Preferably, the weight average molecular weight of the non-aromatic compound is from 100 to 2.000 g/mol, in particular from 200 to 1.000 g/mol.

Preferred non-aromatic compounds are linear or branched, saturated or unsaturated aliphatic hydrocarbons oligomers obtained by reacting unsaturated aliphatic hydrocarbons with unsaturated dicarboxylic acids, dicarboxylic acid anhydrids or dicarboxylic acid amides saturated or unsaturated fatty alcohols saturated or unsaturated fatty acids esters of saturated or unsaturated fatty alcohols with mono-, di-, tri- or tetra carboxylic acids, including saturated or unsaturated fatty acids esters of saturated or unsaturated fatty acids with alcohols other than saturated or unsaturated fatty alcohols or saturated or unsaturated fatty acid anhydrides or amides.

Preferred linear or branched, saturated or unsaturated aliphatic hydrocarbons are hydrocarbons with 6 to 24 carbon atoms which are fully saturated or which have one or two carbon-carbon double bonds. As example octan, octen, decan, decen, dodecan, dodecen etc. may be mentioned.

A preferred oligomer obtained by reacting unsaturated aliphatic hydrocarbons with unsaturated dicarboxylic acids is polyisobutenyl succinic anhydride known as PIBSA. Polyisobutenyl succinic anhydride is, for example, sold by BASF under the trade name Glissopal SA®. Polyisobutenyl succinic anhydride is obtainable by reacting polyisobutylene (which is the polymer of 2-methylpropen=isobutene) and maleic anhydride. Preferred polyisobutenyl succinic anhydride has a number average molecular weight of from 150 to 3.000 g/mol, in particular from 500 to 1.500 g/mol and has a content of succinic anhydride groups of 0.1 to 3 mol succinic anhydride per 1000 g of polyisobutenyl succinic anhydride.

Preferred saturated or unsaturated fatty alcohols have 6 to 24 carbon atoms, one or two hydroxyl groups and are fully saturated or have one or two carbon-carbon double bonds. As example octanol, decanol, tetradecanol (myristyl alcohol), hexadecanol (cetyl alcohol), octadecanol (stearyl alcohol) may be mentioned.

Preferred saturated or unsaturated fatty acids have 6 to 24 carbon atoms, one or two carboxylic acid groups and are fully saturated or have one or two carbon-carbon double bonds. As example saturated fatty acids such as octanoic acid, decanoic acid, tetradecanoic acid, hexadecanoic acid, octadecanoic acid (stearylic acid) and unsaturated fatty acids such as oleic acid (C18), linoleic acid (C18 with two double bonds) may be mentioned.

Preferred esters of fatty alcohols with mono-, di-, tri- or tetra carboxylic acids are esters of the above mentioned fatty alcohols with acrylic acid, malonic acid, maleic acid, fumaric acid or the above mentioned saturated or unsaturated fatty acids.

Preferred esters of saturated or unsaturated fatty acids with alcohols other than saturated or unsaturated fatty alcohols are esters of the above mentioned fatty acids with low molecular weight alcohols such as ethanol, propanol, isopropanol, or n-butanol.

Preferred saturated or unsaturated fatty acid anhydrides or amides are anhydrides or amids of the above mentioned fatty acids.

Particularly preferred are fatty acid and fatty alcohols.

To the Composition of the Tackifier

The tackifier may consist of the resin with repeating units of formula I, only.

In a preferred embodiment, the tackifier comprises the resin with repeating units of formula I and a plasticizer.

In a preferred embodiment, the tackifier comprises at least 0.1 part by weight, particularly at least 1 part by weight and in a more preferred embodiment at least 2 parts by weight of the plasticizer per 100 parts by weight of the resin with repeating units of formula I.

Usually, the tackifier does not comprise more than 100 parts by weight of the plasticizer per 100 parts by weight of the resin with repeating units of formula I.

In a preferred embodiment, the tackifier comprises at maximum 50 parts by weight, in a more preferred embodiment at maximum 30 parts by weight of the plasticizer per 100 parts by weight of the resin of formula I.

In a particularly preferred embodiment the tackifier comprises at maximum 15 parts by weight, in a most preferred embodiment at maximum 10 parts by weight of the plasticizer per 100 parts by weight of the resin of formula I.

Preferred are notably tackifiers comprising 0.1 to 50 parts by weight and, in a most preferred embodiment, 1 to 15 parts by weight of the plasticizer per 100 parts by weight of the resin with repeating units of formula I.

The tackifier may comprise further components. Specifically, the tackifier may comprise other resins than those of with repeating units of formula I or additives such as stabilizers of any kind or solvents. The tackifier might already comprise additives or components which are required or desired in the application, for example stabilizers for rubber or accelerators which are used for the vulcanization of rubber.

In a preferred embodiment, the tackifier consists to at least 80% by weight, in a more preferred embodiment to at least 90% by weight and in a particularly preferred embodiment to at least 97% by weight of the resin with repeating units of formula I and the plasticizer. In a most preferred embodiment the tackifier comprises the resin of formula I and the plasticizer, only, and does not comprise any further resins, additives or solvents.

Preferably, the tackifier has glass transition temperature of 50 to 120° C., notably between 60 and 110° C., determined by Differential scanning calorimetry (DSC).

Preferably, the tackifier has a melting viscosity of 0.1 to 20 Pas, notably of 0.3 to 18 Pas at 170° C.

Preferably, the tackifier has a melting viscosity of 0.01 to 12 Pas, notably of 0.05 to 10 Pas at 200° C.

The tackifier may be prepared by mixing the resin and the plasticizer by any methods known. Preferably, the plasticer is added to the melt of the resin. The temperature of the melt, for example of the molten Koresin, is from 150 to 250° C., in particular from 180 to 230° C. The obtained mixture of resin and plasticizer is preferably stirred until a homogeneous distribution of the plasticizer in the resin is achieved.

In a preferred embodiment, the resin and the plasticizer are mixed during or directly after the preparation of the resin. The obtained resin is still in the molten state and can be easily mixed with the plasticizer.

The melt may be converted into solid granules by pastillation. The granules may be stored or transported for further use of the obtained tackifier.

Usually, the tackifier does still comprise volatile material, which are, in particular, starting materials used for the preparation of the resin. Specifically, such starting materials are compounds of formula $R^2$—$C_6H_4$—OH, notably tertiary butyl phenol, formaldehyde or acetylene. Formaldehyde and acetylene have a very low boiling point and are easily removed already in the polymerization process. The resin usually comprises compounds of formula $R^2$—$C_6H_4$—OH, notably tertiary butyl phenol, as such compounds have a high boiling point and unconsumed starting materials are not easily removed. Furthermore, compounds of formula $R^2$—$C_6H_4$—OH, notably tertiary butyl phenol are newly formed due to decomposition processes of the obtained resin.

Usually, the tackifier comprises at least 1 part by weight, in particular at least 2 parts by weight of compounds of volatile compounds which are preferably compounds of formula $R^2$—$C_6H_4$—OH, notably tertiary butyl phenol, based on 100 party by weight of the total tackifier.

To the Process for the Removal of Volatile Compounds

For the process for removal of volatile compounds, the tackifier must be in the molten state.

Hence, the tackifier must be re-melted if the tackifier is in the solid state, for example, if the tackifier has already been converted into solid granules by pastillation (see above).

In a preferred embodiment, the tackifier melt obtained from mixing the resin with the plasticizer is not solidified but directly used in the process for removal of volatile compounds.

Preferably, the process of this invention is part of a continuous process comprising
  preparation of the resin
  mixing the resin with plasticizer and
  passing the obtained mixture to the process for removal of volatile compounds from the obtained tackifier.

Throughout this continuous process, the resin and the mixture of resin and plasticizer are preferably kept in the molten state.

In the process for removal of volatile compounds, the temperature of the tackifier is preferably at least 150° C., in particular at least 170° C. and most preferably at least 190° C.

In the process for removal of volatile compounds, the temperature of the tackifier is preferably at maximum 250° C., in particular, at maximum 230° C. and most preferably at maximum 220° C.

A particularly preferred temperature range of the tackifier is from 170 to 230° C. and a most preferred temperature range is from 190 to 220° C.

According to a preferred embodiment of the invention, the process is performed under reduced pressure. Preferably, the pressure in the evaporator is 0.1-100 mbar, respectively 0.1 to 50 mbar.

Preferably, the tackifier is passed through at least one evaporator as film with a thickness of 0.01 to 20 mm. More preferably, the tackifier is passed through at least one evaporator as film with a thickness of 0.01 to 10 mm, notably of 0.1 to 6 mm and most preferably of 0.5 to 3 mm.

Useful evaporators for the above process are any evaporators which are designed for the transport of films. Suitable evaporators are known as thin film evaporators.

The film in the evaporator may be transported in any direction, for example downwards (falling film evaporator) or upwards (rising film evaporator).

Preferably, the thin-film evaporator is a falling film evaporator.

Thin-film evaporators are available in various designs as rotary evaporators which includes self-circulation or forced-circulation evaporator, tubular evaporator, through-circulation evaporator or plate evaporator.

The thin film evaporator comprises a vaporizer surface. The tackifier film is passed through the evaporator in direct contact with the vaporizer surface.

The vaporizer surface may have various geometries. The vaporizer surface may be, for example, in the form of a tube which is smooth or provided with surface structuring and which may have, for example, a circular, oval or other cross-section. For example, it may be in the form of a ribbed tube. It may also be in the form of one or more plates. The vaporizer surface is heated by a heat-transfer medium which may be liquid or gaseous.

The volatile compounds are removed from the film. The volatiles may, for example, be fed to an external condenser, condensed and are then obtained as distillate.

The volatile compounds may also be condensed at a condenser surface which is inside the evaporator. The condenser surface may have various geometries as well, it may be a tube as well or a plate. The vaporizer and condenser surfaces are arranged in the evaporator in way that the vaporized components get into contact with the condenser and can be removed. Plate evaporators, for example, may comprise a vaporizer plate and a condenser plate in parallel arrangement, the plates may be spirally wound or predominantly flat.

Shell- and tube evaporators, for example, may comprise a cylindrical arrangement in which two cylinders are placed within one another so that the inner surface of the exterior cylinder and the outer surface of the interior cylinder are directly opposite to each other; one surface being the vaporizer surface and the other the condenser surface.

Shell-and-tube apparatuses in which vaporization takes place either on the inside or the outside of the tubes are wide spread.

In a preferred embodiment, the thin-film evaporator comprises additional mechanical elements. Such mechanical elements are notably elements that support the formation and maintenance of a homogeneous film during the transport of the film through the evaporator, such elements are, for example, wipers.

In a preferred embodiment, the thin film evaporator comprises wipers. Such wipers are, in particular, used in shell-and-tube apparatuses. In a preferred design of such a shell-and-tube apparatus, the wipers are fixed to the surface of a rotating inner tube and the film is transported on the inner surface of the exterior cylinder. The wipers come close or in contact with the moving film thus effecting homogeneity of the film and adjustment of the film thickness.

In thin film evaporators for short pass distillation the distance between the vaporizer and condenser surfaces is low and preferably in the order of magnitude of the free path length of the chemical compounds.

The process for removal of volatile compounds may also be carried out with the use of concomitant striping with an inert gas, preferably nitrogen. In a preferred embodiment, no concomitant striping with an inert gas is performed as such an additional measure is not required to get good results.

The process for the removal of volatile compounds may be a multistage process, using more than one evaporator in serial.

The process may notably be a two- or three-stage process, wherein the tackifier is fed to a first evaporator and then passed in the molten stage to a second evaporator and finally to a third evaporator.

Preferably, the process is a two-stage process, wherein the tackifier is fed to a first evaporator and then passed in the molten stage to a second evaporator.

The thin film evaporators used in a multistage process may be of the same type or different. In a preferred embodiment, all evaporators used in a multistage process, for example a two-stage or three-stage process, are falling film evaporators.

At least one of the thin film evaporators used in a multistage process may be a thin film evaporator for short pass distillation. For example, in case of a two-stage process, both evaporators may be falling film evaporators, with one of them being designed for short pass distillation.

The residence time of the film in the evaporator or—in case of a multistage process—in the evaporators in total may, for example, be 1 second to 30 minutes. Preferably, the residence time is the evaporator or the evaporators in total is 10 seconds to 10 minutes and more preferably 10 seconds to 5 minutes.

Particularly preferred is a two stage-process for the removal of volatile compounds in case of tackifiers with Koresin as the resin.

After the passage of the tackifier-film through the thin-film evaporator, the tackifier has a significantly reduced content of volatile compounds, in particular of tertiary butyl phenol in case of Koresin.

To the Application

Preferably, the tackifier obtained is used as tackifier in rubber compositions.

The rubber composition comprises the rubber, the tackifier and optionally further components. The rubber may be any rubber, as well as a natural or a synthetic rubber. Preferably, the rubber is a compound with at least one double bond which can be crosslinked. Natural rubber is a polymer of isoprene.

Synthetic rubber may be, for example, a synthetic polyisoprene, a polybutadiene (BR), a styrene-butadiene copolymer (SBR), an acrylnitril-butadiene copolymer, an ethylene-propylenediene copolymer or a polychloroprene.

Preferred rubbers are BR or SBR.

In a preferred embodiment, the rubber composition comprises at least 0.1 part by weight, particularly at least 1 part by weight and in a more preferred embodiment at least 2 parts by weight of the tackifier per 100 parts by weight of the rubber.

Usually, the rubber composition does not comprise more than 100 parts by weight of the tackifier per 100 parts by weight of the rubber.

In a preferred embodiment the rubber composition comprises at maximum 50 parts by weight, in a more preferred embodiment at maximum 30 parts by weight of the tackifier per 100 parts by weight of the rubber.

In a particularly preferred embodiment the rubber composition comprises at maximum 15 parts by weight, in a most preferred embodiment at maximum 10 parts by weight of the tackifier per 100 parts by weight of the rubber.

Preferred are in particular rubber composition comprising 0.1 to 50 parts by weight and, in a most preferred embodiment, 1 to 10 parts by weight of the tackifier per 100 parts by weight of the rubber.

The rubber composition may comprise further additives. In particular, rubber compositions usually comprise a vulcanization agent such as elementary sulfur and an accelerator for the vulcanization, such as, for example, zinc oxide or benzothiazol sulfonamides and in particular N-cyclohexyl-2-benzothiazole sulfonamide (CBS).

Other additives are in particular fillers and pigments, for example carbon black and silica.

The rubber composition may be used for the manufacturing of rubber articles. In the manufacturing process the rubber compositions, respectively the parts made therefrom, may be vulcanized as usual. Preferred rubber products obtained are in particular tires for cars or trucks. The rubber articles are finally formed by vulcanization, which is usually performed at elevated temperatures.

The products made from the rubber composition may in particular be composites that comprise other materials, for example reinforcing materials, in particular steel cords which are covered by the vulcanized rubber composition.

The tackifier obtained by the process of this invention has a very low content of volatile compounds. In particular, the tackifier obtained by the process of this invention comprises less than 2000 ppm, preferably less than 1000 ppm volatile compounds. In particular, the tackifier obtained by the process of this invention comprises less than 2000 ppm, preferably less than 1000 ppm tertiary butyl phenol.

Example 2: Two-Stage Evaporation

A falling-film evaporator with wipers having a heating surface area of 0.04 m² was continuously charged with a feed flow of 367 g/h with Koresin, 0.80% TBP, 10% stearyl alcohol. The feed temperature amounted to 165° C. The falling-film evaporator was heated with Marlotherm with a heating temperature of 200° C. The distillation pressure amounted to 10 mbar. 10 g/h was withdrawn as a distillate.

The residue was continuously passed to a short path evaporator as second thin-film evaporator having a heating surface area of 0.04 m².

The feed temperature amounted to 180° C. The short path evaporator was heated with Marlotherm with the heating temperature of 200° C. The pressure amounted to 10 mbar. 57 g/h was withdrawn as a distillate. The residue amounted to 299 kg/h with 0.067% TBP.

Examples 3 to 10

Example 2 has been repeated. The feed temperature for falling-film and short path evaporator were the same as for example 2. Other parameters have been varied as is listed in the table.

The obtained residue of tertiary butyl phenol is found in the last column of the table.

Table: examples 2 to 10 with two-stage evaporation

| | temperature | | pressure | | mass flow | | | concentration | | | |
|---|---|---|---|---|---|---|---|---|---|---|---|
| | heating oil | heating oil | thin- | short | | distillate | distillate | residue | feed | | | |
| No. | thin-film evaporator [° C.] | short pass evaporator [° C.] | film evaporator [mbar] | pass evaporator [mbar] | feed [g/h] | thin-film evaporator [g/h] | short pass evaporator [g/h] | short pass evaporator [g/h] | Koresin [%] | Stearyl alcohol [%] | TBP [%] | residue TBP [%] |
| 2 | 200 | 200 | 10 | 2.2 | 367 | 10 | 57 | 299 | 89.2 | 10.0 | 0.8 | 0.067 |
| 3 | 200 | 200 | 10 | 4.9 | 416 | 11 | 46 | 359 | 89.2 | 10.0 | 0.8 | 0.06 |
| 4 | 200 | 200 | 10 | 10 | 459 | 11 | 42 | 405 | 89.2 | 10.0 | 0.8 | 0.055 |
| 5 | 200 | 210 | 10 | 10 | 413 | 11 | 47 | 355 | 89.2 | 10.0 | 0.8 | 0.085 |
| 6 | 200 | 210 | 10 | 10 | 383 | 13 | 32 | 338 | 94.2 | 5.0 | 0.8 | 0.075 |
| 7 | 200 | 220 | 10 | 10 | 388 | 13 | 34 | 341 | 94.2 | 5.0 | 0.8 | 0.087 |
| 8 | 200 | 230 | 10 | 10 | 383 | 13 | 38 | 333 | 94.2 | 5.0 | 0.8 | 0.12 |
| 9 | 200 | 240 | 10 | 10 | 376 | 12 | 41 | 322 | 94.2 | 5.0 | 0.8 | 0.15 |
| 10 | 200 | 200 | 10 | 10 | 364 | 11 | 19 | 335 | 96.7 | 2.5 | 0.8 | 0.062 |

EXAMPLES

All stated percentages are by weight.

Koresin® of BASF has been used as resin.

Stearyl alcohol has been used as plasticizer.

Mixtures of Koresin and stearyl alcohol have been prepared as described in patent application PCT/EP2017/081051.

Example 1: Falling-Film Evaporator

A falling-film evaporator with wipers was used as thin-film reactor. The falling-film reactor had a heating surface area of 0.08 m² and was continuously charged with a feed flow of 987 g/h with Koresin, 0.85% 4-tert-Butylphenol (TBP), 2.5% stearyl alcohol. The feed temperature amounted to 180° C. The evaporator was heated with Marlotherm with the heating temperature of 208° C. The distillation pressure amounted to 10 mbar. 144 g/h was withdrawn as a distillate. The residue amounted to 843 g/h with 0.16% TBP.

The examples show very good results regarding the residual TBP, best results are achieved with examples 2 to 7 and 10 with a temperature of the tackifier of 200. respectively 210 and 220° C.

The invention claimed is:

1. A process for removing a volatile compound from a tackifier, comprising a resin with repeating units of the following formula I

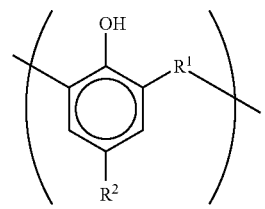

wherein $R^1$ is a linear or branched alkylene group with 1 to 10 carbon atoms and $R^2$ is a linear or branched, saturated or unsaturated aliphatic hydrocarbon group with up to 20 carbon atoms, and optionally a plasticizer, the process comprising passing the tackifier through at least one evaporator as a film and removing the volatile compound from the film, wherein said volatile compound comprise a compound of formula $R_2-C_6H_4-OH$ where $R^2$ is a linear or branched, saturated or unsaturated aliphatic hydrocarbon group with up to 20 carbon atoms.

2. The process of claim 1, wherein $R^1$ in formula I is $CH_2$ or $HC-CH_3$ or $H_2C-CH_2$.

3. The process of claim 1, wherein $R^2$ in formula I is a linear or branched, saturated or unsaturated aliphatic hydrocarbon group with 4 to 10 carbon atoms.

4. The process of claim 1, wherein the resin is obtainable by reacting acetylene and para tertiary butyl phenol.

5. The process of claim 1, wherein the tackifier comprises a plasticizer.

6. The process of claim 5, wherein the plasticizer is a non-aromatic compound comprising at least 50% by weight of one or more linear or branched, saturated or unsaturated aliphatic hydrocarbon groups with at least 4 carbon atoms.

7. The process of claim 6, wherein the non-aromatic compound comprises at least 80% by weight of linear or branched, saturated or unsaturated, aliphatic hydrocarbon groups with from 10 to 60 carbon atoms.

8. The process of claim 6, wherein the non-aromatic compound is selected from the group consisting of:

linear or branched, saturated or unsaturated aliphatic hydrocarbons;

oligomers obtained by reacting unsaturated aliphatic hydrocarbons with unsaturated dicarboxylic acids, dicarboxylic acid anhydrides or dicarboxylic acid amides;

saturated or unsaturated fatty alcohols;

saturated or unsaturated fatty acids;

esters of saturated or unsaturated fatty alcohols with mono-, di-, tri- or tetra carboxylic acids, including saturated or unsaturated fatty acids;

esters of saturated or unsaturated fatty acids with alcohols other than saturated or unsaturated fatty alcohols, and saturated or unsaturated fatty acid anhydrides or amides.

9. The process of claim 1, wherein the tackifier comprises 0.1 to 50 parts by weight of the plasticizer per 100 parts by weight of the resin.

10. The process of claim 1, wherein the tackifier comprises at least 80% by weight of the resin and the plasticizer.

11. The process of claim 1, wherein the tackifier has a glass transition temperature of 50 to 120° C.

12. The process of claim 1, wherein the tackifier is passed through an evaporator as a film having a thickness of 0.01 to 20 mm.

13. The process of claim 1, wherein said tackifier is passed through an evaporator at a temperature of at least 150° C.

14. The process of claim 13. where said tackifier is passed through said evaporator at a pressure of 0.1-100 mbar.

15. The process of claim 1, wherein said tackifier is passed through an evaporator at a temperature of 190 to 220° C.

16. The process of claim 1, wherein the at least one evaporator is a falling film evaporator.

17. The process of claim 1, wherein the process is a multistage process, employing more than one evaporator in serial.

18. The process of claim 1, wherein the process is a two-stage process wherein the tackifier is fed to a first evaporator and then passed in a molten stage to a second evaporator.

19. The process of claim 1, wherein an average residence time of the tackifier in the at least one evaporator is in total from 1 to 30 minutes.

20. The process of claim 1, wherein after passing through said at least one evaporator as a film, said tackifier has a content of said volatile compound of less than 2000 ppm.

* * * * *

UNITED STATES PATENT AND TRADEMARK OFFICE
CERTIFICATE OF CORRECTION

PATENT NO. : 11,498,997 B2
APPLICATION NO. : 16/963681
DATED : November 15, 2022
INVENTOR(S) : Yu et al.

It is certified that error appears in the above-identified patent and that said Letters Patent is hereby corrected as shown below:

On the Title Page

Item (57), Line 3 of the ABSTRACT, "branched alkylen group"
Should read:
--branched alkylene group--; and Item (57), Line 5 of the ABSTRACT, "unsaturated N aliphatic hydrocarbon group"
Should read:
--unsaturated aliphatic hydrocarbon group--.

Signed and Sealed this
Eleventh Day of April, 2023

Katherine Kelly Vidal
*Director of the United States Patent and Trademark Office*